United States Patent [19]

Tahara

[11] 3,925,818

[45] Dec. 9, 1975

[54] HEAD SHIFTING MECHANISM FOR TWO-CHANNEL AND FOUR-CHANNEL CARTRIDGE TAPE RECORDER

[75] Inventor: Kumeo Tahara, Iwaki, Japan

[73] Assignee: Alps Motorola, Inc., Tokyo, Japan

[22] Filed: Aug. 1, 1974

[21] Appl. No.: 493,941

[30] Foreign Application Priority Data

Aug. 2, 1973 Japan .............................. 48-91452

[52] U.S. Cl. .................... 360/106; 360/78; 360/94; 360/109

[51] Int. Cl.$^2$...................... G11B 5/55; G11B 21/08

[58] Field of Search......... 360/106, 109, 93, 92, 78, 360/75, 94; 242/55.19 A, 198–200

[56] References Cited

UNITED STATES PATENTS

| | | | |
|---|---|---|---|
| 3,477,725 | 11/1969 | Housman | 360/106 |
| 3,572,723 | 3/1971 | Jenkins et al. | 360/106 |
| 3,632,114 | 1/1972 | Ban | 360/106 |
| 3,697,084 | 10/1972 | Ban | 360/106 |
| 3,787,058 | 1/1974 | Lyon, Jr. | 360/106 |
| 3,846,838 | 11/1974 | Okamoto et al. | 360/106 |

*Primary Examiner*—Alfred H. Eddleman
*Attorney, Agent, or Firm*—James W. Gillman; Donald J. Lisa

[57] ABSTRACT

A magnetic head shifting mechanism for a two-channel and a four-channel cartridge tape player includes a magnetic tape head having four magnetic pick-up areas, a four stepped head shifting cam, head shifting cam drive, a rotary switch having a rotary contactor portion coupled to the head shifting cam and a contact portion having first, second, third and fourth contacts coupled to the head shifting drive. The cartridge tape player further includes a manual switch coupled to the head shifting drive and to the contact portion of the rotary switch. When a four-channel tape cartridge is in the play position and the manual switch is actuated to energize the head shifting cam drive, the first and fourth contacts of the contact portion are constructed such that when rotary contactor moves from the fourth contact to the first contact, the head shifting drive is continuously energized to rotate the head shifting cam to successive levels to provide continuous play.

6 Claims, 4 Drawing Figures

HEAD SHIFTING MECHANISM FOR TWO-CHANNEL AND FOUR-CHANNEL CARTRIDGE TAPE RECORDER

Background of the Invention

The present invention is in general directed to a two-channel and four-channel cartridge tape recorder, and more particularly to a magnetic head shifting mechanism for a two-channel and four-channel cartridge tape recorder which is operable when either a two-channel stereo tape cartridge or a four-channel stereo tape cartridge is inserted into the player.

In general, for playing a two-channel stereo cartridge having eight recording tracks, the magnetic transducer head must be shifted up and down in four steps to align the head with the magnetic tape, whereas for playing a four-channel stereo cartridge, the transducer head must be shifted in two steps. For a single recording and reproducing device to be compatible with both four-channel and two-channel cartridges, the magnetic head must skip two successive steps of the four steps when playing a four-channel cartridge.

For a better understanding of the features and advantages of the present invention, the head shifting mechanism of the two-channel and four-channel cartridge tape recorder will first be described briefly with reference to FIG. 1. FIG. 1 is essentially a diagrammatic view of a head shifting mechanism and illustrates only the structure essential for an understanding of prior art devices.

In FIG. 1, in which FIG. 1*a* illustrates the mechanical construction and components and FIG. 1*b* illustrates the electrical circuit configuration, reference numeral 1 indicates a head shifting cam which is provided with stepped face cam portion 1*a* and four notches 1*b*, *1c*, *1d* and 1*e* along its outer periphery. A magnetic transducer head 2 is arranged so as to be shifted in its height in four steps in accordance with the elevation of the stepped face cam portion 1*a* when the head shifting cam 1 is rotated. An electromagnetic solenoid 3 includes a plunger 3*a*, a lever 3*b* and a return spring 3*c*. By way of illustration, assuming the front end of the lever 3*b* is engaged with notch 1*b* of the head shifting cam 1, when solenoid 3 is energized with an electric current, the plunger 3*a* is pulled inwardly to cause lever 3*b* to rotate head shifting cam 1 one step. When the solenoid 3 is deenergized the plunger 3*a* and lever 3*b* are returned to their original outward position by the return spring 3*c* whereby lever 3*b* engages notch 1*e* of the head shifting cam 1, thereby being positioned for the next stepped rotation. A rotary switch 4 is mechanically coupled to the bottom surface of the head shifting cam 1 so that rotary contact of the switch 4 rotates together with the rotation of the head shifting cam 1. The rotary switch 4 is composed of a rotary contactor 4*a* having its one end grounded, four stationary contacts 11, 12, 13 and 14 which are arranged to make contact with the rotary contact 4*a*. Contacts 11, 12, 13 and 14 correspond to the first to fourth elevation, in turn, of the magnetic head 2. A contactor 5 is provided which may be short-circuited by an electrically conducting sensing spot secured to track end/start position magnetic tape so as to energize the solenoid 3. A manual switch 6 is connected in parallel to the contactor 5 with one of its terminals being connected to the solenoid 3 and the other terminal being connected to the stationary contact 11 and 12 of the rotary switch 4. The manual switch 6 is adapted for use at any time when the solenoid is required to be energized. A two-channel/four-channel discriminating switch 7 is provided which connects the third and fourth stationary contacts 13 and 14 with the solenoid 3 when a four-channel cartridge is in the play position.

In the head shifting mechanism according to prior art, which is so constructed as described above, there is the major drawback that upon depressing the manual switch 6, the head shifting cam 1 may rotate excessively when a four-channel cartridge is in the play position. That is, when the rotary contact 4*a* is in contact with the stationary contact 11, upon the closing the manual switch 6, electric current will flow through the solenoid 3, the manual switch 6, the stationary contact 11, the rotary contact 4*a*, and the ground in turn to cause the plunger 3*a* to be drawn into the solenoid 3. Thus, the lever 3*b* engages and pulls notch 1*b* to rotate the cam 1 by one-fourth rotation. Such rotation causes the rotary contact 4*a* to move from the stationary contact 11 to the stationary contact 12. At the instant when the rotary contact 4*a* leaves the stationary contact 11, the electric current flow to the solenoid 3 is interrupted and the plunger 3*a* is released from attraction to be returned to its original position by the force of the return spring 3*c*. This is one complete process of the head shifting action. However, because the rotation of the cam 1 is made very rapidly, the rotary contact 4*a* requires approximately only one-twentieth of a second to move from the stationary contact 11 to the stationary contact 12. It is almost impossible for an operator to open the manual switch 6 intentionally within this time period. Therefore, the manual switch 6 may continue to be closed during the time the rotary contact 4*a* moves from the stationary contact 11 to the contact 12. Thus, the electric current, which has been interrupted during the movement of the rotary contact 4*a*, will flow again through the solenoid 3, the manual switch 6, the stationary contact 12, the rotary contact 4*a*, and the ground to energize the solenoid 3. Such energization results in a subsequent process of the head shifting action which moves the rotary contact 4*a* to the next stationary contact, namely, the stationary contact 13. Because both stationary contacts 13 and 14 are connected to the solenoid 3, a similar process is repeated at each stationary contact so as to cause the cam 1 to rotate. Such rapid rotation of the cam 1 makes it very difficult to position the magnetic head 2 at a desired track on the tape by operating the manual switch 6.

In order to overcome the difficulty described above, the prior art has provided additional circuits such as, for example, a transistor switching circuit or electromagnetic relay to open the circuit including the closed manual switch 6 before the rotary contact 4*a* comes into contact with the following stationary contact. However, such additional circuitry has resulted in a player construction that is complex in structure and, therefore, costly to manufacture.

Summary of the Invention

It is, therefore, an important object of the present invention to provide an improved head shifting mechanism simple in construction and less in cost by modifying the shape of the stationary contact and/or the rotary contact to remove the necessity of such additional circuits such as transistor switching circuits or electromagnetic relays.

The improved head shifting mechanism itself, however, both as to its construction and its mode of operation, together with additional features and advantages thereof, will be best understood upon perusal of the following detailed description of specific embodiments with reference to the accompanying drawings.

Detailed Description of the Invention

Figures 1A, 1B, 2A, 2B:
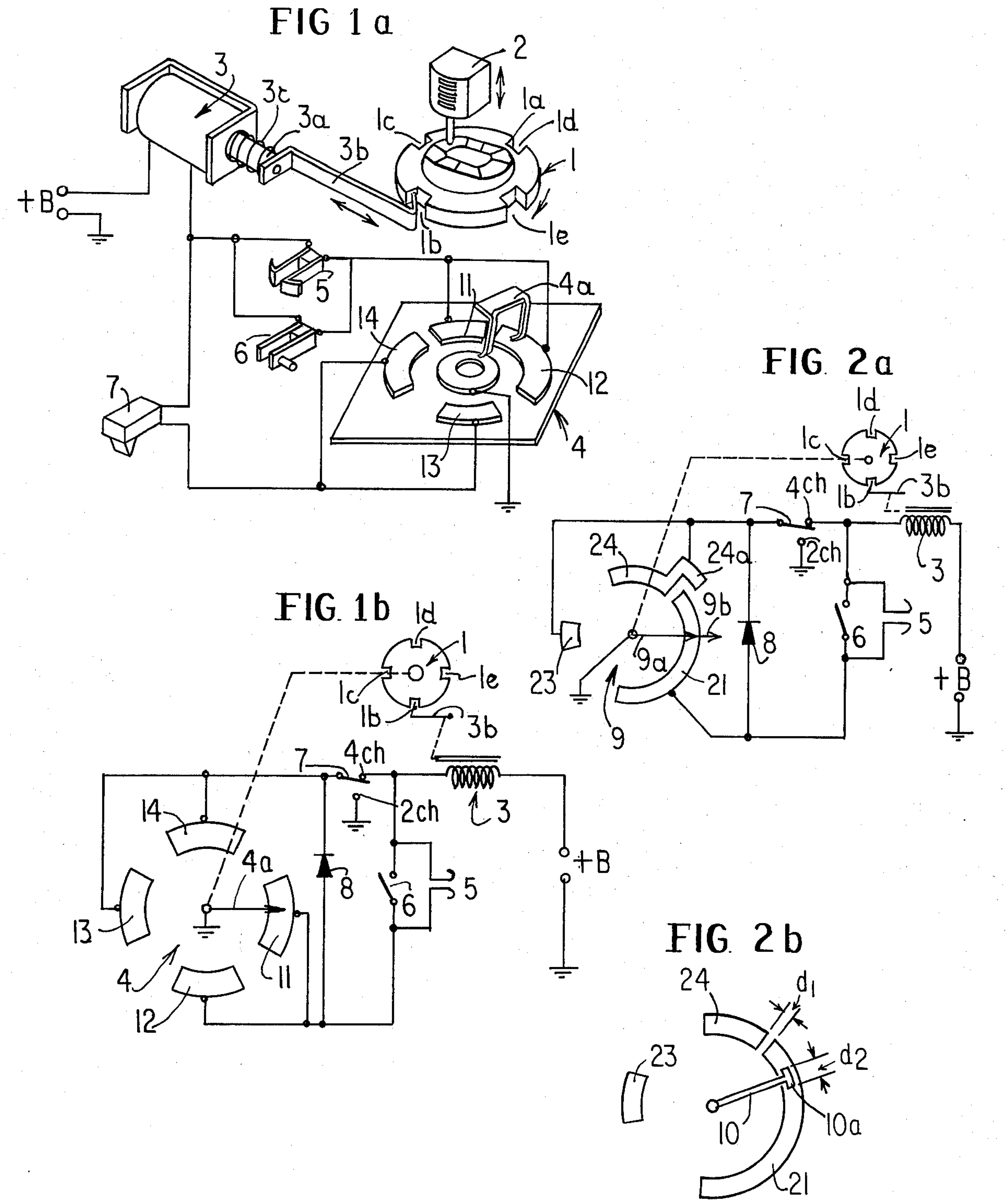
FIG. 1*a* shows a somewhat diagrammatic view of a head shifting mechanism in accordance with the prior art.
FIG. 1*b* shows a circuit diagram of the head shifting mechanism in accordance with the prior art.
FIG. 2*a* is a diagrammatic view of one embodiment of the head shifting mechanism in accordance with the present invention.
FIG. 2*b* shows a partial plane view of a further embodiment of the rotary switch contacts in accordance with the present invention.

The present invention has been made by observing the fact that one complete head shifting action is accomplished in the manner as follows: after the solenoid 3 is energized to rotate the cam 1, the electric current for the solenoid is cut off and the plunger 3*a* is once biased outwardly to its original unactuated position by the return spring 3*c* so as to permit lever 3*b* to engage with the following notch of the cam 1 to be ready for next head shifting action. Accordingly, if the solenoid circuit is maintained ON during the time the magnetic head 2 is shifted from the first to the second elevation and from the fourth to the first elevation, only one action of the solenoid 3 can be made during each period of the head shifting operation. The present invention accomplishes this control by modifying the shape of the stationary contacts.

Attention is drawn to FIG. 2, in which identical mechanical components as shown in FIG. 1 are incorporated therein and indicated with the same symbol or reference numeral. Shown in FIG. 2*a*, a one-piece stationary contact 21 of the rotary switch 9, representing both the stationary contact 11 and 12 of the prior art unit, and corresponding to the first and second elevation of the magnetic head 2. Because contact 21 is so constructed, the solenoid circuit can be maintained ON during the time when the headshifting operation is made from the first to the second elevation. Therefore, rotary contact 9*a* moves only one step at the instant of closing of the manual switch 6, and excessive movement of the rotary contact 9*a* will not occur.

Rotary switch 9 includes contactor portions 9*a* and 9*b* which are attached to cam 1, and rotatable therewith, as will be understood by the following description.

Stationary contact 23 corresponds to stationary contact 13 of the prior art unit and the third elevation of the magnetic head 2 and stationary contact 24 corresponds to stationary contact 14 of the prior art unit and the fourth elevation of the magnetic head 2. Contact 24 includes a projection portion 24*a* which is provided to maintain the solenoid circuit ON when the rotary contactor extension 9*b* shifts from the stationary contact 24 to the stationary contact 24*a*. Because the stationary contact 24 is connected directly to the solenoid 3 by the four-channel discriminating switch 4*ch* when a four-channel cartridge is in the play position, the contact 24 must be disconnected from stationary contact 21. At same time, however, to prevent contact jumping, the solenoid circuit must be maintained ON during the time the rotary contactor 9*a* moves between the stationary contacts 24 and 21. The projection portion 24*a* and contactor extension 9*b* accomplishes this function by permitting contactor 9*b* to engage projection portion 24*a* as contactor 9*a* moves from stationary contact 24 to stationary contact 21.

Because the rotary switch 9 of the present invention is constructed as described above, when a four-channel cartridge is in the play position the magnetic head 2 is positioned at its first elevation, upon the closing of the manual switch 6, the magnetic head 2 will be shifted to the second elevation and stopped without excessive movement regardless of the time period of closing the manual switch 6. When the magnetic head 2 is so positioned at its second elevation, upon the closing the manual switch 6, the magnetic head 6 will be returned to the first elevation thereby skipping the third and fourth elevations to provide continuous play.

Referring now to FIG. 2*b*, a further embodiment of the rotary switch in accordance with the present invention is illustrated. In order to maintain the solenoid 3 attracting the plunger 3*a* successively between the fourth and first stationary contacts, the width *d*2 of a rotary contactor 10 at its contactor portion 10*a* is designed wider than the gap width *d*1 between the fourth and first stationary contacts 24 and 21 respectively. In order to perform such operation the rotary switch 10 may be constructed so that, with utilizing the rotary contactor 10 just the same as the prior art, the gap width *d*1 is selected to be less than the width *d*2 of contactor 10 so that the solenoid 3 will remain ON during the time rotary contactor 10*a* passes over the gap *d*1 between contacts 24 and 21.

Referring to FIG. 1*b*, when a two-channel cartridge is in the play position, the two-channel/four-channel discriminating switch 7 connects stationary contacts 13, 14 to circuit ground. Also switched to ground is the cathode of a diode 8 whose anode connects to stationary contacts 11, 12. In this mode a current path from B+, through solenoid 3, switch 6, stationary contacts 11, 12 and movable contact 4*a* to ground is created when it is desired to actuate the indexing system to the second or third positions, respectively. A current path through B+, the solenoid 3, the switch 6, and the diode 8 to ground is established when it is desired to actuate the indexing system to the fourth or the first positions. Thus, the indexing system permits actuation to any of four positions in the two-channel mode.

With a four-channel cartridge in the play position switch 7 connects stationary contacts 13, and 14 and the cathode of diode 8, to one side of solenoid 3, whose remaining side connects to B+. Thus, B+ voltage is constantly applied to contact 13 and 14 in this mode. Also, diode 8 is back biased such that it is effectively removed from the circuit. When the system is actuated from the first to the second, or from the second to the third positions, a current path is created which is identical to that in the two-channel mode. However, when the movable contact 4*a* contacts stationary contact 13, i.e. the third position, it is automatically actuated to move to contact 14, i.e. the fourth position, whereat it is again automatically actuated to engage contact 11. Thus the indexing mechanism permits actuation to either of two positions in the four-channel mode.

It is seen that the two current paths are established in the embodiments according to the invention, as illustrated in FIGS. 2*a*, *b*.

As described above, the present invention provides an inexpensive head shifting mechanism having an improved construction without considerable modification to the two and four-channel cartridge type tape players of the prior art.

Although the present invention has been described with respect to certain specific embodiments, it will be appreciated that modifications and changes may be made by those skilled in the art without departing from the true spirit and scope of the invention.

I claim:

1. A magnetic head shifting mechanism for a cartridge-type tape player adapted to receive and play two-channel and four-channel tape cartridges and including a changeover switch mechanism between a first position when a two-channel tape cartridge is inserted into the player and a second position when a four-channel tape cartridge is inserted into the player, including in combination:

magnetic tape head means having four pick-up areas, head shifting cam means mounted to the player and engageable with said tape head means, said cam means being rotatable between first, second, third and fourth levels to align said pick-up areas with selected tracks on the tape, drive means coupled to said cam means for rotating said cam means between said first, second, third and fourth levels, rotary switch means including a rotary contactor portion coupled to said cam means and a contact portion having first, second, tnird and fourth contacts coupled to said drive means for actuating the same to rotate said cam means, the contact portion further including means for aligning the contacts with respect to the contactor such that a selected sequential one of the contacts is in electrical engagement with the contactor as the contactor is rotated, and manual switch means coupled to said drive means and to said rotary switch means for energizing said drive means to rotate said cam means when the changeover switch mechanism is in the second position, said rotary contact portion and said first and fourth contacts being constructed to continuously energize said drive means as said contactor portion moves from said fourth contact to said first contact when the changeover switch is in the second position and said manual switch means has been actuated to energize said drive means to rotate said cam means to successive levels to thereby align said pick-up areas with selected tracks on the tape.

2. The magnetic head shifting mechanism in accordance with claim 1 wherein said first and said second contacts of said contact portion are combined together to form a one-piece contact to continuously energize said drive means as said contactor portion moves from said first contact to said second contact.

3. The magnetic head shifting mechanism in accordance with claim 1 wherein said drive means includes a solenoid operating to engage said head shifting cam means to move the same to align said pick-up areas with selected tracks on the tape.

4. The magnetic head shifting mechanism in accordance with claim 1 wherein said fourth contact of said contact portion contains a projection portion thereon, said projection being selectively engageable with said contactor portion to permit said contactor portion to continuously energize said drive means as said contactor portion moves from said fourth contact to said first contact.

5. The magnetic head shifting mechanism in accordance with claim 4 wherein said contactor portion further includes an extension portion which is selectively engageable with said projection portion.

6. The magnetic head shifting mechanism in accordance with claim 1 wherein the width of said contactor portion of said rotary switch exceeds the distance between said fourth and said first contacts such that when said contactor portion moves from said fourth contact to said first contact said drive means is continuously energized.

* * * * *